J. F. & H. E. SIPE.
SPRING WHEEL FOR VEHICLES.
APPLICATION FILED DEC. 14, 1909.
1,080,378.
Patented Dec. 2, 1913.
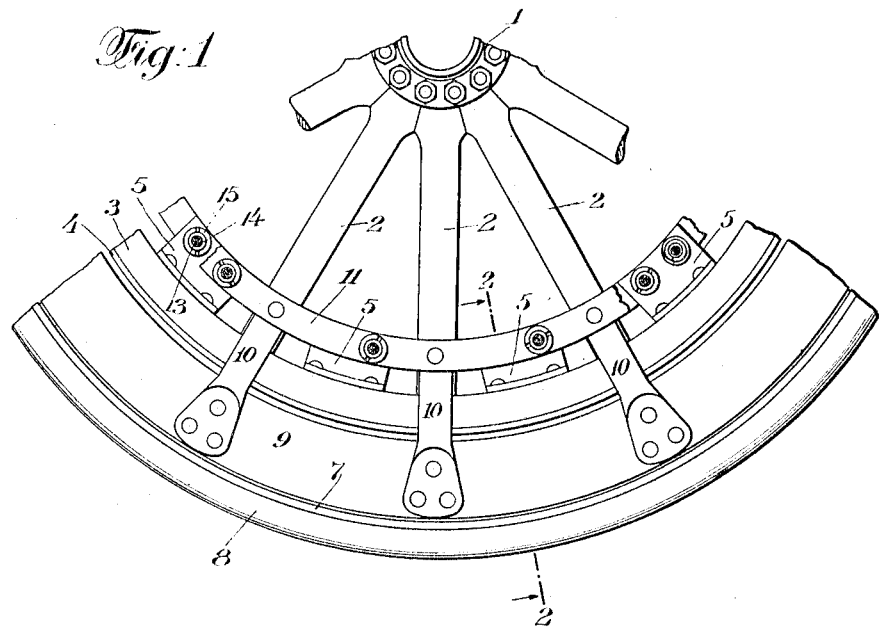
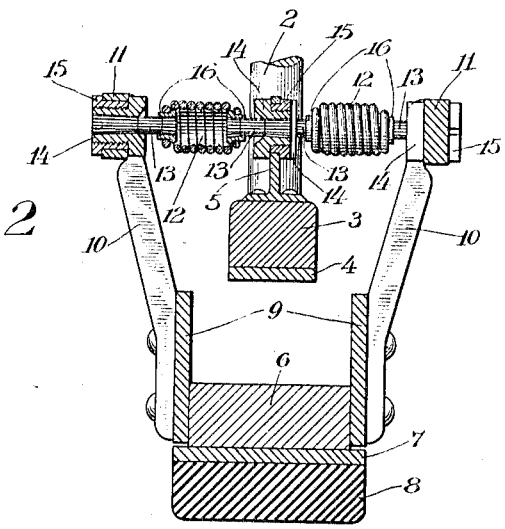

UNITED STATES PATENT OFFICE.

JOHN F. SIPE AND HARRY E. SIPE, OF NEW YORK, N. Y.

SPRING-WHEEL FOR VEHICLES.

1,080,378.   Specification of Letters Patent.   Patented Dec. 2, 1913.

Application filed December 14, 1909. Serial No. 532,978.

*To all whom it may concern:*

Be it known that we, JOHN F. SIPE and HARRY E. SIPE, citizens of the United States, and residents of New York city, in the county and State of New York, have invented certain new and useful Improvements in Spring-Wheels for Vehicles, of which the following is a specification.

The invention relates to a spring wheel of that general type in which the hub member is suspended upon the tread member by springs set parallel to the axis of the wheel and connected at one end to the hub member, and at the other end to the tread member. In this type of wheel it has heretofore been considered necessary to connect the springs with the respective parts by means of some form of universal joint since in each revolution of the wheel the inner end of the spring moves completely around the other end of the spring in a circular path, the spring itself in each such revolution describing what is substantially a cone. This is necessarily true in all cases in which the springs are set parallel to the axis of the wheel. No universal joint has yet been devised which will permit of this movement without more or less sliding of the parts over one another, producing a grinding action which involves very great wear and materially shortens the life of the parts. If the connecting parts are small they are likely to wear out quickly; and if they are large, as in the case of certain forms of ball and socket joints, these larger parts in moving upon one another make a very disagreeable noise. Again in wheels of this character having springs parallel with the axis attached to the respective members by universal joints, a slight wearing of the parts of the universal joints allows a relatively large initial movement between the hub member and the tread member due to this wearing of parts, and thus a slight wearing of the parts will materially change the initial resilience unless special means are provided for continuously taking up the wear by the adjustment of the springs or their connections.

Our invention is designed to overcome the difficulties just enumerated by providing an inextensible flexible member between the springs and the wheel member at each end thereof. This flexible member is made of a plurality of very thin steel wires. One end of this flexible member is attached rigidly to one end of the spring and the other end of the flexible member is attached rigidly to some part of one of the wheel members, for example, to a bracket, plate or wall of the said wheel member. The flexible member should be of sufficient length to permit it to move to the different angles which the spring may assume in the operation of the wheel.

In the best form of our invention these wires are firmly attached at each end in a ring or socket and one of these rings or sockets is rigidly fastened to one end of the spring and the other ring or socket is rigidly fastened to one of the wheel members.

The invention is illustrated in the accompanying drawings in which—

Figure 1 is a side view of a part of a wheel embodying the said invention; and Fig. 2 is a cross-section of the tread member and part of the hub member on the line 2—2 of Fig. 1 showing the manner in which the springs and flexible members are arranged between the same.

Referring to the drawings, 1 is the hub of a wheel.

2, 2 are the spokes.

3 is a wooden felly.

4 is a steel band attached in any suitable manner to the periphery of the felly 3.

5, 5 are T-shaped brackets which are bolted or otherwise suitably fastened to the inside of the felly 3. These brackets are preferably placed midway between the spokes of the wheel as shown in Fig. 1.

The parts already enumerated constitute the wheel member containing the hub or what may be called the hub member of the wheel.

6 is a wooden felly constituting a part of the tread member of the wheel. This wooden felly is preferably made three inches larger in inside diameter than the outside diameter of the steel band 4 of the hub member.

7 is a steel band which is fastened in any suitable manner to the periphery of the felly 6.

8 is a thin solid rubber tire which is fastened in any suitable manner to the outer surface of the band 7.

9, 9 are side plates which are preferably annular in form and which are bolted or otherwise suitably fastened to the sides of the felly 6, as shown in Fig. 2.

10, 10 are arms which are bolted or otherwise suitably fastened at their outer ends to the side plates 9, and which are bolted or otherwise suitably fastened at their inner ends to the annular plates 11. There is an annular plate 11 on each side of the wheel supported from the side plate 9 on that side of the tread member.

The parts from 6 to 11 inclusive constitute a wheel member containing a tread, or what may be called the tread member.

The hub member and the tread member are connected together by means of the coiled springs 12 and the inextensible flexible members 13. We prefer to place half of these springs on one side of the plane of the wheel and half of them on the other side of the plane of the wheel and arrange them in pairs as shown.

Referring to the flexible members which connect the outer ends of the springs with the tread member, it will be seen that the outer end of the flexible member is inserted in a threaded ring or socket 14 which passes through a hole in the annular plate 11 and which is held firmly in place in the plate 11 by means of the nut 15 screwing upon the end of the socket 14. The inner ends of these flexible members are secured in rings or sockets 16 to which the outer ends of the springs are secured by having the end of the spring coiled around a shoulder on the socket 16 as shown. The flexible members which connect the inner ends of the springs with the brackets 5 are attached in like manner to the springs and the brackets as clearly shown in Fig. 2. The sockets 14 and 16 are provided with rounded or beveled edges where the flexible members emerge from the same to afford a bearing for the flexible members, as shown in Fig. 2.

We prefer to set the springs parallel or nearly parallel to the axis of the wheel and under very slight initial tension, as a result of which they will all act alike in opposing the load on the hub member at all times. As a result of this construction it will be apparent that the flexible members allow the springs to operate at any angle, according to the weight of the load or the degree of shock, and the springs are thus caused to expand simply in an endwise direction in a perfectly natural manner no matter what the relative position of the hub member and the tread member may be, the flexible members operating in all respects like universal joints but without their disadvantages and being inextensible and therefore strong and durable and having a uniform operation.

From the foregoing it will be seen that our invention supplies a spring wheel which is entirely free from parts which move one upon another in the operation of the device and in which, therefore, the wearing of parts due to this cause is done away with and the wheel is made of much greater durability. This construction also substantially does away with the noise which is produced by structures, such as universal joints, in which the parts move one upon another. Our construction also does away with the disadvantage due to friction caused by the moving or sliding of parts one upon another.

Since in our construction the springs are called upon to perform no other service than a natural endwise expansion, the springs may be made light, small and compact, thus securing neatness and economy of construction.

What we claim as new and desire to secure by Letters Patent, is:

1. In a spring wheel, the combination of a wheel member containing a hub, a wheel member containing a tread and two series of coiled springs, each coiled spring provided with two flexible members consisting of thin steel wires, one rigidly attached to each end of the spring, the springs set approximately parallel to the axis of the wheel, one series on each side of the plane of the wheel, one flexible member of each spring rigidly attached to the hub member and the other flexible member of each spring rigidly attached to the tread member.

2. In a spring wheel the combination of a wheel member containing a hub, a wheel member containing a tread, the coiled springs 12, the flexible members 13 made of steel wires, the sockets 14 fastened to the hub member and to the tread member respectively, to which the outer ends of the flexible members are attached, the sockets 16 to which the inner ends of the flexible members are attached and to which the ends of the coiled springs are connected, the sockets 14 being provided with a rounded edge to afford a bearing for the flexible members.

In testimony whereof, we have signed our names to this specification, in the presence of two subscribing witnesses.

JOHN F. SIPE.
HARRY E. SIPE.

Witnesses:
EDWIN SEGER,
JOHN O. GUNPLER.

---

Copies of this patent may be obtained for five cents each, by addressing the "Commissioner of Patents, Washington, D. C."